May 26, 1942. A. F. GREINER 2,284,199
TORQUE TRANSMITTING SLIP JOINT
Filed Jan. 8, 1940 2 Sheets-Sheet 1
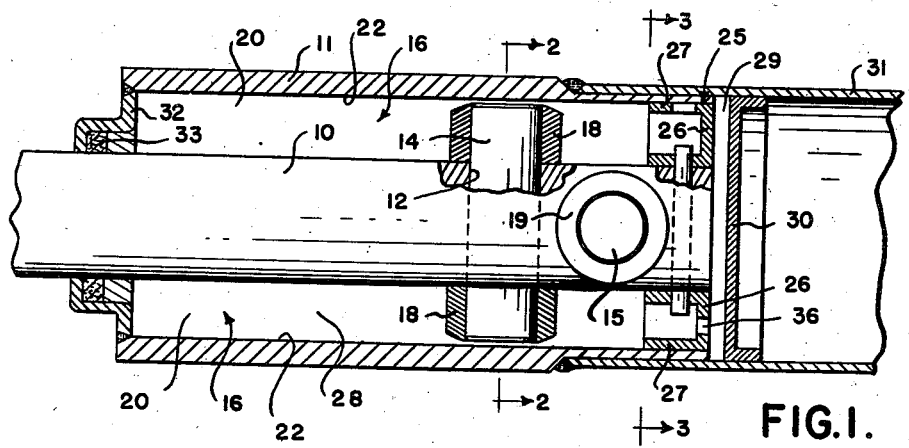
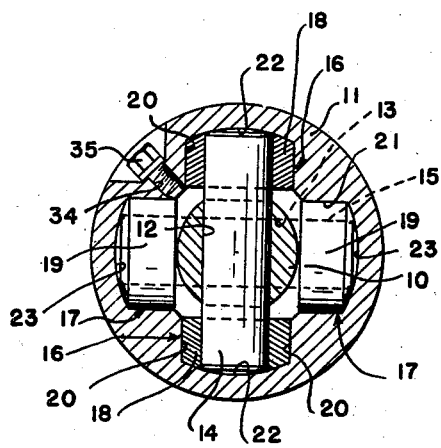 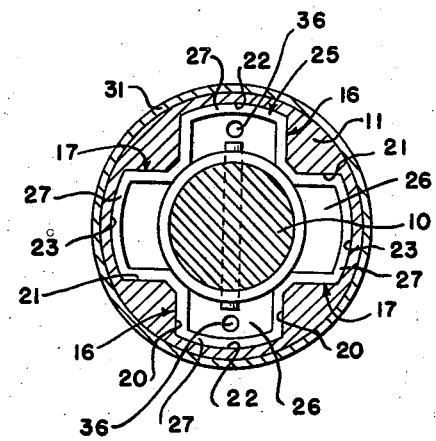
FIG. 2. FIG. 3.
INVENTOR.
ANTON F. GREINER
BY
ATTORNEYS May 26, 1942.　　A. F. GREINER　　2,284,199
TORQUE TRANSMITTING SLIP JOINT
Filed Jan. 8, 1940　　2 Sheets-Sheet 2
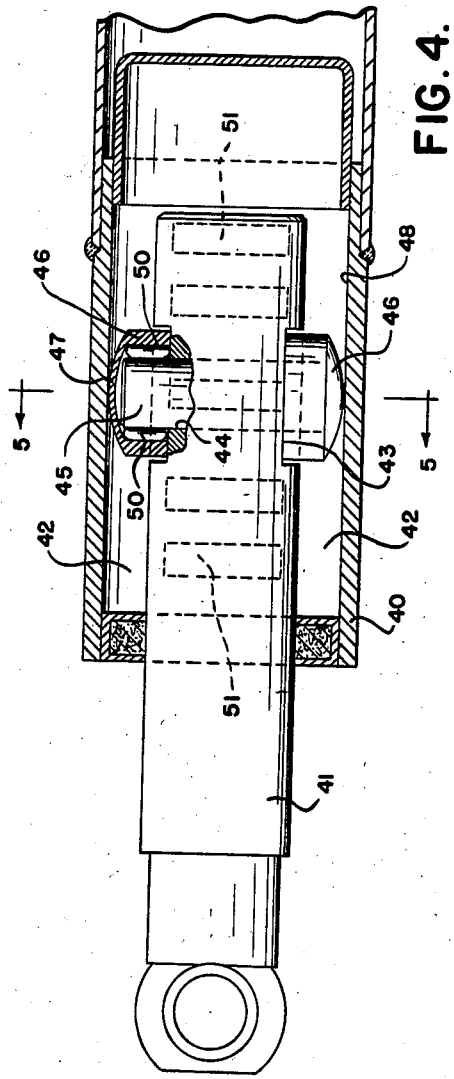
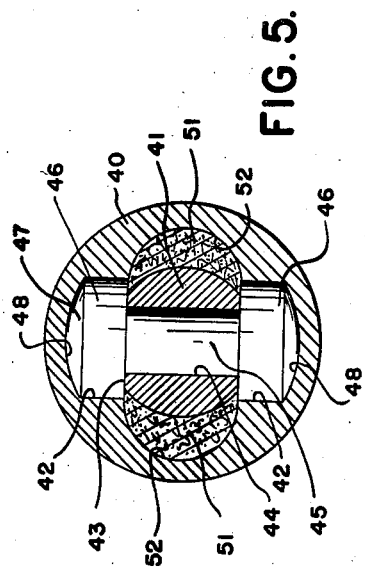
INVENTOR.
ANTON F. GREINER
BY
ATTORNEYS Patented May 26, 1942

2,284,199

UNITED STATES PATENT OFFICE 2,284,199

TORQUE TRANSMITTING SLIP JOINT

Anton F. Greiner, Detroit, Mich.

Application January 8, 1940, Serial No. 313,006

4 Claims. (Cl. 64—23)

This invention relates generally to torque transmitting slip joints of the type employed in motor vehicles to operatively connect the power plant to the road engaging driving wheels.

Torque transmitting slip joints of the above general type are usually provided with telescopically engaging members operatively connected through the medium of torque transmitting means to impart rotative movement from one member to the other and also capable of relative axial movement in opposite directions to permit the length of the joint to be extended or shortened in dependence upon rise or fall of the axle of the vehicle in relation to the power plant. In some instances, the torque is transmitted through the medium of splines extending longitudinally of one member and slidably engaging in grooves in the other member. This particular arrangement is objectionable because difficulty is experienced in forming the cooperating splines and grooves sufficiently accurate to avoid whip during operation and at the same time insure relative sliding movement of the members with the minimum friction losses.

It is one of the principal objects of this invention to overcome the objection mentioned above by providing a construction permitting relative sliding movement of the members with the minimum friction or power loss and at the same time reduces any whip of either or both of the members to a minimum.

Another feature of this invention resides in the provision of a torque transmitting slip joint having shock absorbing means for resisting relative axial movement of the members in opposite directions in a manner to dampen any shocks or whip caused by sudden rise or fall of the axle relative to the power plant.

Still another advantageous feature of the present invention resides in the provision of a torque transmitting slip joint which is relatively simple in construction and which provides for distributing the stresses over a greater length of the relatively slidable members previously set forth.

The foregoing, as well as other objects, will be made more apparent as this description proceeds, especially when considered in connection with the accompanying drawings, wherein:

Figure 1 is a longitudinal sectional view through a joint constructed in accordance with this invention;

Figure 2 is a cross sectional view taken substantially on the plane indicated by the line 2—2 of Figure 1;

Figure 3 is a cross sectional view taken on the line 3—3 of Figure 1;

Figure 4 is a longitudinal sectional view through a slightly modified form of slip joint;

Figure 5 is a cross sectional view taken substantially on the plane indicated by the line 5—5 of Figure 4.

A slip joint embodying the novel features of this invention is shown in the drawings as comprising a torque transmitting member 10 in the form of a shaft and a tubular driven member 11 telescopically receiving the shaft or member 10. Upon reference to Figure 1, it will be noted that the shaft is formed with a pair of openings 12 and 13 therethrough spaced from each other axially of the shaft with their axes intersecting the axis of the shaft 10 at right angles to the latter axis. It will also be observed from the above figure that the axis of the opening 12 extends at right angles to the axis of the opening 13 and both openings are formed in the shaft 10 adjacent the rear end of the latter.

A pair of pins 14 and 15 having a length greater than the diameter of the shaft are respectively pressed into the openings 12 and 13 in such a manner that the opposite ends of the pins extend radially outwardly from the shaft into grooves formed in the inner surface of the outer tubular member 11. As shown in Figure 2, the opposite ends of the pins 14 extend into the pair of diametrically opposed grooves 16 and the opposite ends of the pins 15 extend into the grooves 17 positioned between the grooves 16. The grooves extend longitudinally of the outer member 11 and have a width sufficiently greater than the diameter of the pins to receive suitable rollers.

Referring again to Figure 2, it will be noted that a pair of rollers 18 are respectively rotatably mounted on the opposite ends of the pin 14 and a second pair of rollers 19 are respectively rotatably mounted on the opposite ends of the pin 15. The diameter of each roller is predetermined in dependence upon the width of the grooves so that the rollers 18 have a rolling engagement with the opposite side walls 20 of the grooves 16 and the rollers 19 have a similar rolling engagement with the opposite side walls 21 of the grooves 17. It will also be seen from Figure 2 that the base portions 22 of the grooves 16 and the base portions 23 of the grooves 17 have a common radius concentric with the axis of the tubular member 11. In addition, it will be observed that the radially outer ends of the rollers are formed to provide a surface of a sphere having a radius approximating the radius of the base portions of the grooves and having a rolling engagement with the latter base portions. The rollers are held in proper spaced relation radially of the joint by engagement of the radially inner ends thereof with the shaft 10.

It follows from the above that the rollers not only transmit torque from one member to the other but, in addition, permit longitudinal sliding movement of the members relative to each other in opposite directions with the minimum friction loss between the engaging portions of the joint. Moreover, by offsetting the two pairs of rollers axially of the joint, the construction of the latter is simplified considerably and the stresses are distributed over a greater length of the cooperating members 10 and 11.

The above construction is particularly advantageous when used in conjunction with the driving coupling commonly employed in motor vehicles to connect the power plant to the ground engaging driving wheels, since it provides for variations in length of the coupling to compensate for rise and fall of the wheels without introducing any appreciable friction or loss of power. However, it has been found that even with such an efficient sliding joint of the type set forth above sudden movements of the driving wheels either upwardly or downwardly often causes objectionable vibrations of the driving connection and frequently imparts severe shocks to the power plant.

In order to eliminate the above objections, provision is made herein for absorbing or cushioning any shocks resulting from sudden movements of the ground engaging driving wheels. In detail, a piston 25 is secured to the rear end of the shaft 10 beyond the torque transmitting rollers and is provided with radially outwardly extending projections 26 having side walls 27 slidably engaging the walls of the grooves in the outer tubular member 11 to separate the space 28 in front of the piston from the space 29 in rear of the piston. As shown in Figure 1, the rear wall of the space 29 is formed by a baffle 30 in the form of a disc having a peripheral flange welded or otherwise secured to a tubular extension 31 of the member 11. The front wall of the space 28, on the other hand, is formed by a plate 32 having the periphery welded or otherwise secured in the front end of the tubular member 11. The plate 32 is formed with a central opening therethrough for receiving the shaft 10 and is fashioned to retain a suitable packing or seal 33 surrounding the shaft 10 to prevent the escape of lubricant out of the space 28. In the present instance, the spaces 28 and 29 are filled with lubricant through a suitable filler opening 34 in the tubular member 11 and this opening is normally closed by a screw 35.

Referring again to Figure 1 of the drawings, it will be seen that the piston 25 has suitable openings 36 establishing communication between the spaces or chambers at opposite sides of the piston and these openings are calibrated to afford the transfer of fluid from one space to the other at the rate required to provide the desired damping action to relative movement of the members 10 and 11 in either direction axially of the joint. Assuming that the several parts of the joint are in the relative positions thereof shown in Figure 1 and that the driving wheels, indirectly connected to the rear end of the extension 31, are suddenly displaced either upwardly or downwardly, it will be noted that the length of the joint is extended. As a result, the volume of the space 28 becomes less due to movement of the outer tubular member 11 rearwardly relative to the shaft 10 or piston 25 and lubricant or fluid escapes from the space 28 into the space 29 through the openings 36 in the piston, as well as through the limited clearance provided between the piston and tubular member 11. Accordingly, the energy of any shock resulting from sudden displacement of the driving wheel is gradually absorbed or damped in dependence upon the rate of transfer of the fluid through the piston which, in turn, is controlled by the number and size of the openings 36.

It also follows from the above that relative movement of the members 10 and 11 in directions to reduce the length of the joint enlarges the space 28 and reduces the volume of the space 29. Accordingly, lubricant or fluid escapes from the space 29 into the space 28 through the openings 36 and a damping action results depending upon the rate of transfer of fluid or upon the size and number of openings 36.

Referring now to the embodiment of the invention illustrated in Figures 4 and 5, it will be noted that the slip joint comprises an outer tubular member 40 and an inner member 41 in the form of a cylindrical shaft extending into the tubular member in sliding engagement with the inner surface of the latter. The inner surface of the tubular member is fashioned with longitudinally extending grooves 42 positioned on diametrically opposite sides of the axis of the tubular member.

The end of the shaft 41 projecting into the tubular member is machined or otherwise formed with diametrically opposed flat surfaces 43 and an opening 44 is formed in this portion of the shaft for receiving a transverse pin 45. The pin 45 has a press fit in the opening 44 and the opposite ends of the pin project beyond the flat surfaces 43 into the grooves 42. A roller 46 is rotatably mounted on each end of the pin 45 and these rollers respectively extend into the grooves 42.

Upon reference to Figure 5, it will be noted that the cylindrical side walls of the rollers have a rolling engagement with the opposite side walls of the grooves 42 and the radially outer ends 47 of the rollers are curved on a radius predetermined to engage the correspondingly curved base 48 of the grooves 42. In the present instance, friction is reduced to the minimum by mounting the rollers 46 on needle bearings 50 interposed between the projecting ends of the pin and the adjacent inner cylindrical surfaces of the rollers.

It follows from the above that the rollers not only permit relative sliding movement between the two members 40 and 41 in the direction of the axis of the latter, but also effectively transfer torque from one member to the other. It will also be noted that the construction is relatively simple and may be manufactured at a comparatively low cost.

In order to insure proper lubrication of the relatively slidable parts of the joint, a series of lubricant retaining inserts 51 are secured in recesses 52 formed on diametrically opposite sides of the tubular member between the grooves 42. The recesses 52 and, accordingly, the inserts 51 are spaced from each other longitudinally of the tubular member 40 and the inner surfaces of the inserts are shaped to have a bearing engagement with the opposite sides of the shaft 41.

What I claim as my invention is:

1. In a torque transmitting joint, an elongated hollow member having two pairs of longitudinally extending grooves formed in the inner surface thereof with one pair of grooves positioned at right angles to the other pair and with the grooves of each pair diametrically opposed, the surfaces of the base portions of the grooves being concentric with the axis of the hollow member, an inner member extending into the hollow member, a pair of rollers mounted on the inner member at diametrically opposite sides of the latter and having a common axis of rotation extending perpendicular to the axis of the inner member, said rollers respectively extending into the grooves of one pair and having a rolling engagement with the opposite side walls of the latter grooves, a second pair of rollers carried by the inner member at diametrically opposite sides thereof in spaced relation to the first pair of rollers axially of the inner member and having a common axis of rotation extending perpendicular to both the axis of the inner member and the common axis of rotation of the first pair of rollers, said second pair of rollers respectively extending into the grooves of the other pair and having a rolling engagement with the side walls of the latter grooves, the radially outer end of each roller formed with a spherical surface having a radius approximating the radius of the base portions of the grooves and slidably engaging said base portions.

2. In a torque transmitting joint, an elongated hollow member having one end closed and having diametrically opposed longitudinally extending grooves in the inner surface thereof, a shaft extending into the hollow member through the closed end of the latter and having a diameter less than the internal diameter of the hollow member, a pin extending transversely through the shaft and having the opposite ends respectively extending into said grooves, a roller rotatably mounted on each end of the pin and having a rolling engagement with the side walls of the grooves, a piston secured to said shaft adjacent the pin and having diametrically opposed outwardly extending projections respectively extending into the grooves, said projections having a sliding fit with the side walls of said grooves and cooperating with the shaft and with the closed end of the hollow member to form a space for fluid at one side of the piston, means in the hollow member beyond the piston and cooperating with the latter to form a space for fluid at the opposite side of the piston, and means providing for restricted flow of fluid past the piston from one space to the other upon relative sliding movement of the hollow member and shaft in opposite directions.

3. In a torque transmitting joint, an elongated hollow member having one end closed and having two pairs of longitudinally extending grooves formed in the inner surface of the hollow member with the grooves of each pair diametrically opposed, a shaft extending into the hollow member through the closed end of the latter and having a diameter less than the internal diameter of the hollow member, a pin extending transversely through the shaft and having the opposite ends respectively extending into one pair of grooves, a roller rotatably mounted on each end of the pin and extending into said one pair of grooves for rolling engagement with the opposite side walls of said grooves, a second pin extending transversely through the shaft at right angles to the first main pin and having the opposite ends respectively extending into the one pair of grooves, a roller rotatably mounted on each end of the second named pin and extending into the said other pair of grooves for rolling engagement with the opposite side walls of the latter grooves, a piston secured to the end of the shaft in the hollow member and having two pairs of outwardly extending projections respectively extending into said grooves and slidably engaging the walls of the grooves, said piston and shaft cooperating with the closed end of the hollow member to form a space for fluid at one side of the piston, means in said hollow member beyond the shaft cooperating with the latter and piston to form a space for fluid at the opposite side of the piston, and means providing for restricted flow of fluid past the piston from one space to the other upon relative sliding movement of the hollow member and shaft in opposite directions.

4. In a torque transmitting joint, an elongated hollow member having diametrically opposed longitudinally extending grooves in the inner surface thereof, a shaft extending into the hollow member and having a diameter substantially less than the internal diameter of the hollow member, a pair of rollers respectively rotatably mounted on opposite sides of the shaft and respectively extending into the grooves in a manner to have a rolling engagement with the side walls of said grooves, a piston secured to the shaft in axial spaced relationship to the rollers and having diametrically opposed outwardly extending projections respectively extending into the grooves, means at opposite sides of the piston forming a space at each side of the piston for fluid, and means providing for restricted flow of fluid past the piston from the space at one side of the piston to the space at the opposite side of the piston upon relative movement of the hollow member and shaft in opposite directions.

ANTON F. GREINER.